BERNARD PARKER
INVENTOR.
ATTORNEYS

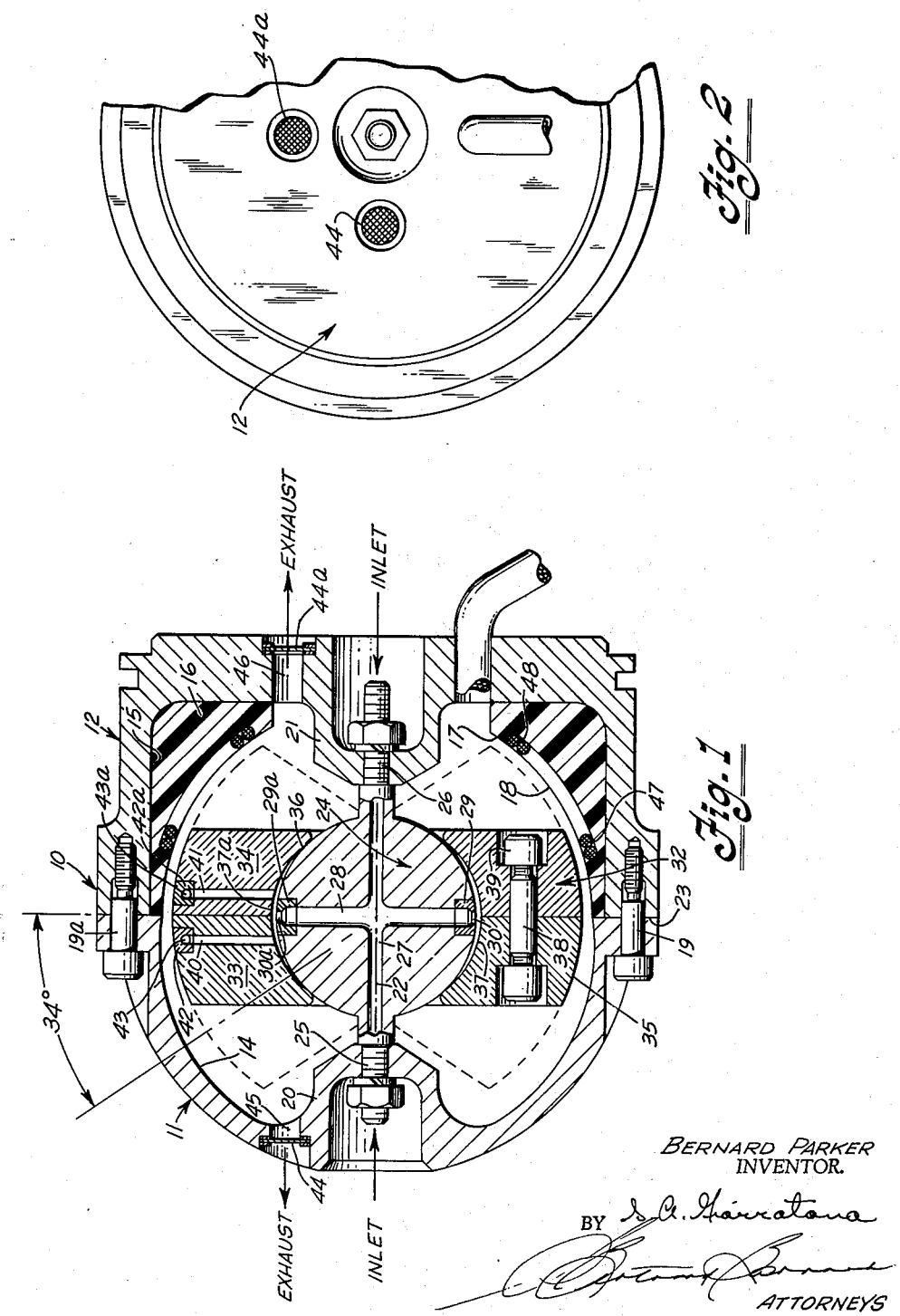

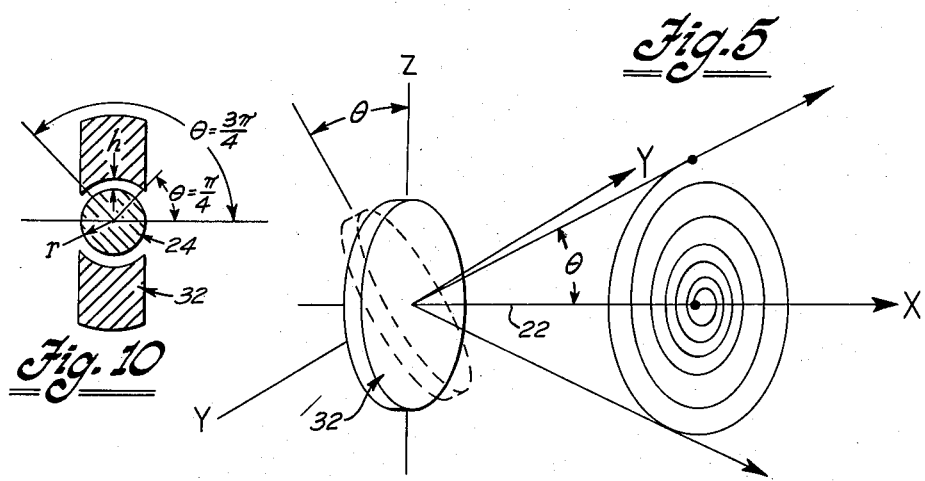
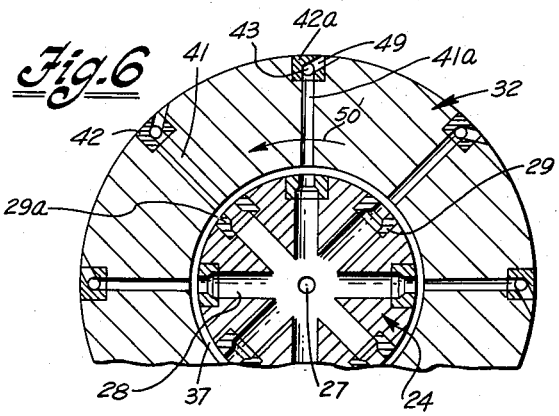
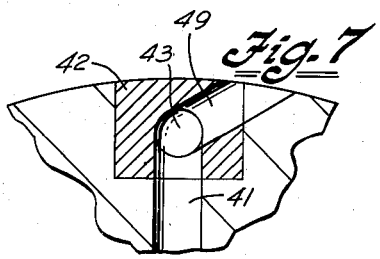
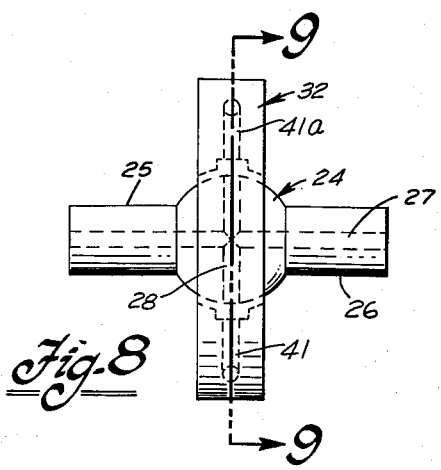
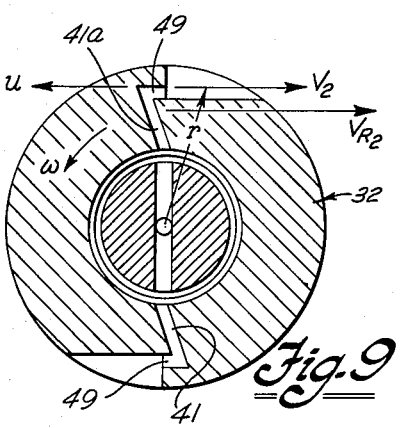
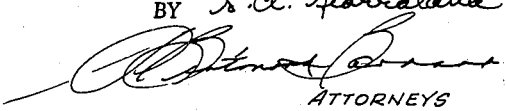

though the plug, which are con-
nected to the radial passages through the rotor.

FIGURE 8 is a schematic longitudinal section similar to FIGURE 4, through the rotor support member and the rotor shown in FIGURE 4, showing the connecting passages through the rotor and the rotor support member.

FIGURE 9 is a schematic cross-section, similar to FIGURE 6, through the rotor and the rotor support member shown in FIGURE 8, showing the radial passages through the rotor, and the tangential outlet passages connected to the radial passages.

FIGURE 10 is a schematic diagram of the rotor and the rotor support member, similar to that shown in FIGURE 8, showing various symbols used in conjunction with the computations incorporated in the specifications.

Figure 3:
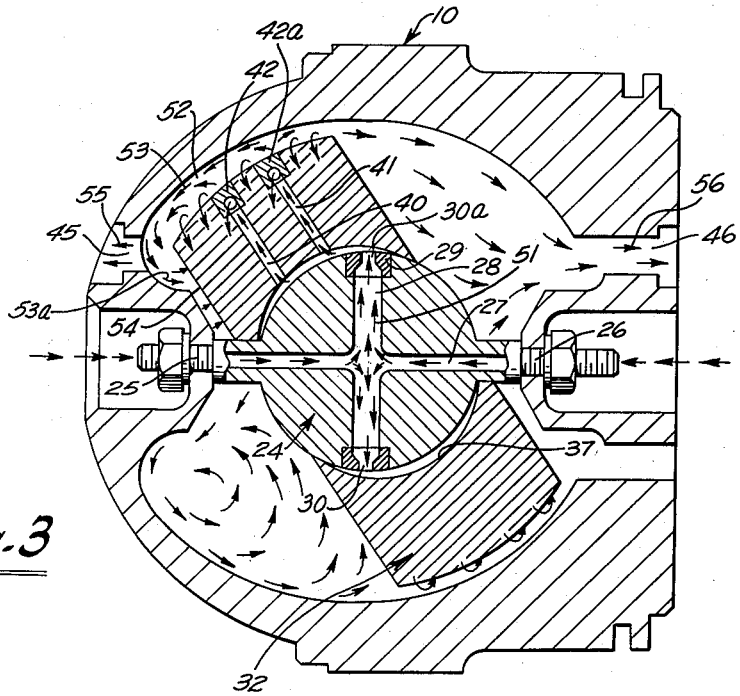

It will be understood that the following description of the construction nad the method of attachment, wiring, operation and utilization of the "free rotor gas bearing gyro" is intended as explanatory of the invention and not restrictive thereof.

In the drawings, the same reference numerals designate the same parts throughout the various views, except where otherwise indicated.

Figure 4:
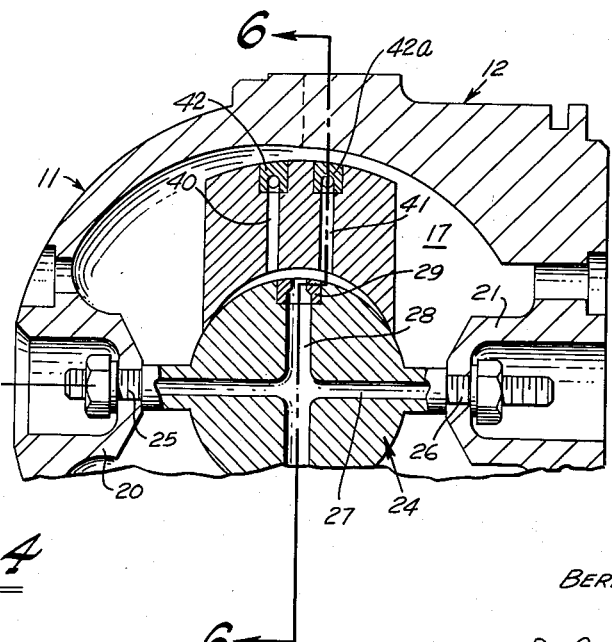

One embodiment of the gyro shown in FIGURES 1, 3 and 4 comprise a hollow housing 10 formed in two sections 11 and 12, connected at the center thereof, one section 11 of the housing having a cavity therein, the cross-sectional outer surface of which is in the form of an involute curve 14, or other arcuate cross-sectional contour therein, the second section 12, having a substantially cylindrical cavity 15, therein. The cylindrical cavity 15 of the section 12 of the housing has a plastic insert 16, inserted therein and fixedly fastened thereto, the plastic insert having a central cavity 17 of spherical segmental cross-sectional contour therein, with an annular recess 18, of spherical segmental cross-section, extending over a portion of the cavity.

The two sections 11, 12, of the housing are fastened to one another by a plurality of headed bolts or cap screws 19, 19a, the body of each of which is inserted through an opening through one section 11, of the housing, the threaded end of the body of each screw being threadably fitted to a threaded opening in the opposite section 12, of the housing.

A hollow central hub 20, 21, is integral with each section 11, 12 of the housing, the hubs which are co-axial with the longitudinal axis 22 of the housing sections extend inward toward the central connecting plane 23, between the two sections 11, 12 of the housing. The inner wall of each hollow hub has a central opening therethrough.

A spherical segmental rotor support member 24 having a pair of stepped cylindrical stub shafts 25, 26 integral with the ends thereof, is inserted into the central cavity of the two housings, each stub shaft being inserted through one of the openings through the hollow hubs 20, 21.

One axis of the rotor support member is aligned with the plane of connection 23 between the two housing sections, the rotor support member 24 and the stub shafts 25, 26 being co-axial with the longitudinal axis of the housing sections. The rotor support member 24 has a central passage 27, therethrough, co-axial with the longitudinal axis 22 of the housing sections, a plurality of auxiliary passages 28, 28a being cut through the center of the rotor support member in a plane perpendicular to the longitudinal axis. These auxiliary passages 28, 28a may be equally spaced radially as shown in FIGURE 6, the number of individual passages corresponding to the number of passages 40, 40a through each row of passages in the rotor, or other suitable combination may be used. In

United States Patent Office 3,115,784
Patented Dec. 31, 1963

3,115,784
FREE ROTOR GAS BEARING GYRO
Bernard Parker, Teaneck, N.J., assignor to General Precision Inc., Little Falls, N.J., a corporation of Delaware
Filed June 28, 1961, Ser. No. 120,304
6 Claims. (Cl. 74—5.12)

This invention relates to gyroscopes for use in navigation systems for aircraft and the like, and is particularly directed to a gas bearing supported gyro, suitable for use in guided missiles and the like.

It is primarily directed to a gas bearing supported and gas driven gyro, which is suitable for use in applications in which the operating period of the gyro is relatively short, the time required for bringing the gyro rotor up to operating speed also being extremely short.

A primary feature of the gyro is that it is of the free rotor type, no gimbals or other type of conventional rotor support means being necessary.

Another feature is that the gyro rotor is accelerated to its operating speed from its normal stationary position by a gas under pressure supplied by a gas propellant storage means, the same gas being utilized to support the gyro rotor during the operating rotation thereof.

Another feature of the invention is that the gas used for supporting the gyro rotor is also used for caging the gyro rotor.

A primary object of the invention is to provide a small, compact gyro, having a total of only three basic elements, or parts, said parts being relatively simple to produce and assemble.

Another object is to provide a gyro which is relatively simple, of low cost, and primarily suitable for installations, in which the total time required for operating the gyro is relatively short.

Another object is to provide a gas-supported, gas driven gyro, having no gimbal or other mechanical parts required to support and drive the rotor of the gyro.

The accompanying drawings, illustrative of one embodiment of the invention, together with the description of its construction and the method of operation, control, mounting, application and utilization thereof, will serve to clarify further objects and advantages of the invention.

In the drawings—

FIGURE 1 is a longitudinal section through one embodiment of the free rotor gyro, showing the rotor, the rotor support member, and the housing in which the rotor is mounted.

FIGURE 2 is a side elevational view of a portion of the free rotor gyro shown in FIGURE 1.

FIGURE 3 is a schematic longitudinal section, similar to FIGURE 1, of the gyro shown in FIGURE 1, with the rotor shown in its initial position, as the start of the run-up period.

FIGURE 4 is a schematic longitudinal section, similar to FIGURE 3, of the gyro shown in FIGURES 1 and 3, with the rotor angularly displaced into its normal operating position.

FIGURE 5 is a schematic diagram of the rotor of the gyro shown in FIGURE 1, the rotor being shown at the starting position, corresponding to FIGURE 3, in dash lines, and in the normal operating position similar to that shown in FIGURE 4, with a plane through the center of the rotor substantially perpendicular to the longitudinal axis of the rotor support shaft.

FIGURE 6 is a cross-section through the rotor and the rotor support member shown in FIGURES 1 and 4, the section being taken on the line 6—6, FIGURE 4.

FIGURE 7 is an enlarged section through one of the insert plugs shown in FIGURE 6, inserted through the spherical segmental outer surface of the rotor, showing the connecting passages the construction shown in FIGURE 6 eight equally-spaced radial passages are cut through the rotor support member.

A plurality pair of insert plugs 29, 29a is inserted into the rotor support member at the spherical outer surface thereof, each insert plug being co-axial with one end of one of the auxiliary passages 28, 28a through the rotor support member. Each insert plug 29, 29a has a reduced diameter nozzle opening 30, 30a therethrough, each nozzle opening being axially aligned with, and in direct communication with one of the auxiliary passages 28, 28a, through the rotor support member, for reasons hereinafter described in greater detail.

A rotor 32, formed of a conductive material, in two sections 33, 34 connected on a plane aligned with the connecting plane 23 between the two sections of the housing, is fitted to the rotor support member 24, the spherical segmental inner surface of the two sections of the rotor being accurately fitted to the spherical segmental outer surface of the rotor support member.

The spherical segmental outer surface 35 of the rotor sections, is fitted to the spherical segmental inner surface of the plastic insert 16, a thin air gap of spherical segmental form being formed between the inner surface of the plastic insert 16, and the spherical segmental outer surface of the rotor 32.

The inner spherical segmental surface 36 of the rotor sections, adjacent the junction plane thereof, has a relatively thin spherical segmental recess 37, 37a therein, the recess providing a bearing support cavity between the spherical segmental inner surface of the rotor, and the mating spherical segmental outer surface of the rotor support member 24.

The two sections 33, 34 of the rotor which are fitted around the spherical segmental section of the rotor support member are fixedly attached to one another by a plurality of bolts or studs 38, inserted through both sections 33, 34 of the rotor, one or more nuts 39, threadably fitted to each bolt or stud, clamping the two sections 33, 34 of the rotor to one another.

As shown in FIGURES 1 and 6, each section 33, 34 of the rotor has a plurality of rows of radially positioned passages 40, 40a, 41 and 41a therethrough, each row of passages being substantially parallel to the separator plane between the rotor sections, and spacedly located relative thereto. The inner end of each of the passages 40, 41 in each row, is in direct communication with the corresponding recess 37, 37a in the spherical segmental inner surfaces of the rotor, thus providing direct communication between the auxiliary passages 28, 28a through the rotor support member and the radial passages 40, 41 through the rotor sections.

A plurality of plugs 42, 42a is inserted into the spherical segmental outer surface of each of the rotor sections 33, 34, one plug 42, 42a being co-axially aligned with each of the radial passages 40, 41 in each row.

Each of the plugs 42, 42a has a short cavity 43, 43a therethrough.

As shown in FIGURES 6 and 7, an angularly positioned outlet opening 49, 49a is cut through the spherical segmental outer surface of each of the insert plugs 42, 42a, each of the outlet openings 49, 49a being in communication with and angularly positioned relative to, the radially positioned cavity 43, and the corresponding passage 40, 41, through the rotor section 33, 34. The cavities 43, 43a allow the gas to enter the inner edge of the passages 40, 41 through the rotor sections, from the inner spherical segmental surface thereof. The gas is discharged through the cavity 43, 43a, through each of the insert plugs, thence through the corresponding angularly positioned outlet opening 49, 49a, the gas being discharged in a direction which is substantially tangential to the circumferential outer surface of the rotor.

As the gas is discharged through the substantially tangential outlet openings 49, 49a through the plugs of the rotor 32, the reaction force of the gas causes the rotor 32 to rotate in a direction corresponding to the arrow 50, shown in FIGURE 6.

Exhaust openings 45, 45a, 46, 46a are cut through the outer wall of each of the housing sections 11, 12, each exhaust opening being radially aligned with the corresponding hollow hub 20, 21 of the housing section, the axes of the exhaust openings 45, 46 being substantially parallel to the longitudinal axis 22 of the housing sections.

Each of the exhaust openings 45, 46 has an enlarged counterbore at the outer end thereof, a strainer 44, 44a of substantially circular form being inserted in each of said counterbores, to prevent the admission of solid material, or other extraneous material into the interior of the housing, through the exhaust openings 45, 46 therethrough.

The exhaust openings are adapted to allow gas fed to the interior of the housing 10, through the passages 40, 41 through the sections of the rotor to be discharged therethrough.

Two pair of pick-off coils 47, 48 are inserted into the annular recess 18, through the plastic insert 16 fitted to one housing section, the windings of one pair of pick-off coils 48 being displaced through 90° from those of the other pair of pick-off coils 47.

In order to operate the pick-off mechanism, shown in FIGURE 1, an alternating current is sent through each of the pick-off coils 47, 48, the current creating a magnetic field through each pick-off coil, the magnetic field from the pick-off coil producing circular eddy currents, co-axial with the longitudinal axis of the conductive rotor 32.

The extent of the pick-off coil coverage by the spherical segmental outer surface of the rotor 32, varies as a function of the position of the rotor 32, and eddy currents varying from the operating rotor position shown in FIGURES 1 and 4 to the angularly displaced position shown in FIGURE 3.

The eddy currents through the rotor 32, in turn create a magnetic field, opopsing that produced by the pick-off coils 47, 48. The superimposition of the two magnetic fields, reduces the effective inductance of the pick-off coils 47, 48 and causes a variation of the magnitude and phase of the current. The variation with the cover angle $\theta$ of the current as shown in FIGURE 5, appears as a change of output voltage. Two pick-off coils 47, 48 properly placed and located, relative to the rotor 32, operate in conjunction with one another, to provide a null at the neutral position of the rotor, shown in FIGURES 1 and 4 and a gradient which is a function of the displaced rotor angle shown in FIGURE 5.

The operation of the gyro shown in FIGURES 1, 3 and 4 is substantially as follows:

As shown in FIGURE 3, gas under pressure is injected through the openings through the stub shafts 24, 25, into the central passage 27, through the rotor support member 24.

As indicated by the arrows 51, 51a, the gas passes through the auxiliary openings 28, 28a through the rotor support member, thence through the nozzle openings 30, 30a, through the insert plugs 28, 29a, from which it enters the gap between the spherical segmental outer surface of the rotor support member 24, and the recess 37 in the spherical segmental inner surface of the rotor 32.

The gas in the area between the recess 37 and the spherican segmental outer surface of the rotor support member 24, hydrostatically lifts and supports the rotor 32, while the gas flows through the radial passages 42, 42a, and the tangential outlet openings 49, 49a, the gas pressure torquing the rotor in the manner hereinbefore described.

With the rotor 32 in the displaced angular position, shown in FIGURE 3, a substantial part of the gas under pressure flows from the gap between the circumferential outer surface of the rotor 32, thence through the rows of radially positioned passages 40, 40a, 41, 41a through the rotor, 32, thence through the cavities 43, 43a through the insert plugs 42, 42a, and out through the angularly positioned discharge openings 49, 48a through the insert plugs 42, 42a.

This causes the rotor to rotate in the direction of the arrow 50, shown in FIGURE 6.

A portion of the gas, discharged from the discharge openings 49, 49a through the insert plugs, enters the area 52 in the left-hand housing section which is surrounded by an involute cross-sectional curve.

This portion of the gas follows the arrows 53 in the housing, a portion of the gas flowing into the narrow angular area adjacent the left-hand edge 54, of the rotor 32, thereby angularly displacing the rotor until it reaches the operating position shown in FIGURES 1 and 4, with the plane of connection between the rotor sections 33, 34, substantially perpendicular to the longitudinal axis 22 of the housing sections.

The rotor is thus caged, by the gas under pressure which engages the left-hand edge of the rotor. During the caging operation the rotor is hydrostatically supported by the gas under pressure, in the area between the recess in the center of the rotor, and the circumferential outer surface of the rotor.

The gas supply from a high-pressure gas bottle, or other suitable gas supply source continues until the rotor reaches its erected position, shown in FIGURES 1 and 4, the rotor reaching its final operating speed of approximately 24,000 r.p.m.

After the flow from the gas bottle, or other pressure source stops, the rotor rotates freely. The rotor is supported hydrodynamically by the gas under pressure contained in the area between the recess 37 in the inner diameter of the rotor, and the circumferential outer surface of the rotor support member.

At this point with the rotor rotating freely, the unit can be considered a free rotor gyro.

The computations covering this operation are hereinafter included.

Instead of high pressure gas bottle supply source a pressure gas source such as that generated by an explosive charge or a pyrotechnic charge may be substituted.

The Squib-activated gas bottle, or other type of gas supply source supplies gas to the spherical segmental inner bearing of the rotor to lift the rotor hydrostatically from the spherical segmental outer surface of the rotor support member 24, and also provide the torque to drive the rotor to its final operating speed.

Computations show that a rotor having an angular momentum of $0.5 \times 10^6$ gm./cm./sec., can be accelerated to a speed of 24,000 r.p.m. in about one-half second.

After leaving the area within the housing sections 11, 12, the gas follows the arrows 55, 56 and is discharged through the exhause openings 45, 46 in the outer walls of both sections 11, 12 of the housing.

The angular momentum of the gyro about any axis equals $0.5 \times 10^6$ gm. cm.$^2$/sec.; the operational life is approximately two minutes (20,000 r.p.m. to 16,000 r.p.m.) and the maximum drift rate 0.5 degree per minute.

CAGING

The gas flow during the run-up phase of the operation is utilized to capture and hold the gyro rotor 32, in a predetermined position, relative to the longitudinal axis of the case. This is achieved by directing the flow of gas along the involute curve 14 of the case section 11, in the direction of the arrows 53, 53a, against the left-hand face 54 of the rotor, so that the rotor senses a torque, and the effective angle of the applied torque lags the tilt angle of the gyro rotor.

That is the application of the torque has both an in-phase component and a component 90° out of phase. The out-of-phase component acts as damping to restore the rotor to the central operating position shown in FIGURES 1 and 4. When the flow of the gas stops, the flow into the involute area in the case section 11 also stops, and the gyro rotor is uncaged.

When the flow of gas from the pressure source stops, the rotor, is free to rotate. During this period the rotor is supported hydrodynamically by the gas contained in the area between the recess in the inner surface of the rotor, and the circumferential outer surface of the rotor support member.

At this point, the unit can be considered a free rotor gyro.

DESIGN CALCULATIONS

Symbols Employed $T$ = torque (inch-pounds)
$I$ = inertia (inch-pounds sec.$^2$)
$\omega$ = angular velocity of flywheel (radians)
$F$ = force (pounds)
$r$ = radius (inches)
$t$ = time (seconds)
$W$ = gas weight flow (pounds/second)
$V_R$ = gas relative exit velocity ($u + V_2$, ft./sec.)
$V_2$ = absolute exit velocity (feet/second)
$g$ = gravitational constant (feet/second$^2$)
$C_V$ = specific heat at constant volume
$C_P$ = specific heat at constant pressure
$T$ = absolute temperature (degree R)
$\rho$ = density (pounds/cubic foot)
$R$ = gas constant
$A$ = cross-sectional area (square feet)
$P$ = pressure (pounds/square foot)
$\mu$ = viscosity (pounds sec./square inch)
$h$ = gas (inches)
$O$ = angle between shaft axis and flywheel edge
$\Delta E$ = energy change (inch-pounds)
$u$ = linear velocity of wheel tip (feet/sec.)

DESIGN CALCULATIONS FOR RADIAL FLOW REACTION ROTOR DRIVE

Weight flow calculations.

FIGURES 8 and 9 show diagrammatically the radial flow reaction drive velocity of the gyro rotor shown in FIGURE 1.

The torque and angular acceleration relationship is $$T = I \frac{d\omega}{dt} \tag{1}$$

where:

$I$ = moment of inertia of rotor
$\omega$ = angular velocity of rotor in Rad/sec.

The torque at the rim of the rotor can be expressed by the tangential force F multiplied by the radius $r$ of the tangential outlet openings of the rotor.

$$T = I \frac{d\omega}{dt} = Fr \tag{2}$$

thus $$F = \frac{I}{r} = \frac{d\omega}{dt} \tag{3}$$

The energy balance of the rotor can be written as $$Fu = \frac{W}{g} \mu (V_{R2} - u) \tag{4}$$

or $$F = \frac{W}{g} (F_{R2} - \omega r) \tag{5}$$

where:

$W$ = weight flow in (lbs./sec.)
$V_R$ = relative exit velocity in ft./sec.
    = $u + V_2$
$V_2$ = absolute exit velocity in ft./sec.

Substituting Equation 3 into 5, we obtain $$\frac{d\omega}{dt} = \frac{\omega r}{gI}(V_{R2} - \omega r) \quad (6)$$

from which we obtain $$\frac{d\omega}{V_{R2} - (\omega r)} = \frac{\omega r}{gI} dt \quad (7)$$

Integrating both sides we obtain $$\frac{1}{r} \ln(V_{R2} - \omega r) \Big|_{\omega_0}^{\omega_1} = \frac{\omega r}{g_1} t \Big|_{t_0}^{t_1} \quad (8)$$

From the start of the rotor operation, $$t_0 = 0$$

and $$\omega_0 = 0$$

to the operating speed $\omega_1$ during the time $t_1$, this equation may be written as $$\ln\left(\frac{V_{R2}}{V_{R2} - \omega_1 r}\right) = \frac{\omega r^2}{gI} t_1 \quad (9)$$

Substituting all quantities into Equation 9 and solving for weight flow W we obtain $$W = -\frac{gI}{r^2 t_1} \ln\left(\frac{V_{R2}}{V_{R2} - \omega}\right)$$

$$= \frac{(3^{86})(0.177)(10^{-3})}{(1^2)(0.5)}(1)\frac{(1238)}{(1029)}$$

$$= 0.0252 \text{ lb. per sec.}$$

Gas bottle size—

For the total time of 0.5 sec. run up operation, the total weight required is $$WT = (0.0252)(0.5) = 0.0126 \text{ lbs. or } 0.202 \text{ oz.}$$

Assume a cartridge of internal pressure of 5000 lbs. per sq. in., the volume of the cartridge is $$\text{Vol.} = \frac{(0.0126)(53.3)(530)}{(5000)(144)}$$

$$= (0.495)(10^{-3}) \text{ cu. ft. or } 0.855 \text{ cu. in.}$$

where:

$P_2 = 14.7$
$T_1 = 530°$ R.
$T_2 = 439°$ R.

A spherical container having an inside diameter of 1.18 in., is required, and its weight is estimated to be 0.7 oz.

Calculation for viscous drag and rundown of a gas bearing viscous drag of gas supported rotor shown in FIGURE 10

$$df = \frac{\mu r}{h} dA$$

$$= \frac{\mu r \omega \sin \theta \, dA}{h}$$

$$= \frac{\mu r \omega \sin \theta \, 2\pi r^2 \frac{\sin \theta}{d\theta}}{h}$$

$$dT = r \sin \theta \, dF$$

$$= \frac{2\pi \mu \omega r^4}{h} \sin^3 \theta \, d\theta$$

$$T = \frac{2\pi \mu \omega r^4}{h} \int_{\theta_1}^{\theta_2} \sin^3 \theta \, d\theta$$

$$= \frac{2\pi \mu \omega r^4}{h} \left[ -1/3 \cos \theta \, (\sin^2 \theta + 2) \right]_{\theta_1}^{\theta_2}$$

For the cases represented by the gyro $$\theta_2 = \frac{3\pi}{4} \qquad \theta_1 = \frac{\pi}{4}$$

Therefore, substituting $$T = \frac{2\pi \mu \omega r^4}{h} \left[ -1/3 \cos \frac{3\pi}{4}\left(\sin^2 \frac{3\pi}{4} + 2\right) \right.$$

$$\left. +1/3 \cos \frac{\pi}{4}\left(\sin^2 \frac{\pi}{4} + 2\right) \right]$$

$$= \frac{2\pi \mu \omega r^4}{h}[-1/3(0.707)(0.707^2 + 2)$$

$$+1/3(0.707)(0.707^2 + 2)]$$

$$= \frac{2\pi \mu \omega r^4}{h}[1.18]$$

$$= \frac{7.41 \mu \omega r^4}{h}$$

Viscous power loss in bearing $$\text{Power} = T\omega$$

$$\text{Power} = \frac{7.41 \mu \omega^2 r^4}{h}$$

For the design hereinbefore described, and shown in FIGURE 10 of the drawings $r = 0.375$ inch
$\mu = 0.29 \times 10^{-8}$ lbs. sec. per sq. in.

$$\text{Power} = \frac{0.741(0.29 \times 10^{-8})(0.375^4)(\omega^2)}{h}$$

$$= 4.25 \times 10^{-11} \frac{\omega^2}{h} \text{ lb. ins. per sec.}$$

$$= 0.48 \times 10^{-11} \frac{\omega^2}{h} \text{ watts}$$

$$\text{Power} = \frac{\Delta E}{t} = \frac{1}{2} \frac{I(\omega^2 - \omega_1^2)}{t}$$

$$= \frac{0.177 \times 10^{-3}(\omega_2^2 - \omega_1^2)(746)}{(12)(550)(2t)}$$

$$= 10^{-5} \frac{(\omega_2^2 - \omega_1^2)}{t}$$

$$t = 10^{-5} \frac{(\omega_2^2 - \omega_1^2)}{P}$$

From Equation 9 any unknown perimeter can be calculated if others are known.

To solve for the exit temperature at which the absolute exit velocity is sonic, the following simultaneous equation are used:

$$V_2^2 = 2gICC_P(T_1 - T_2) = 2gRT_2$$
$$T_2 = 439° \text{ R.}$$

and $$\mu = V_2 \, 1029 \text{ ft. per sec.}$$

In this design $r = 1$ inch
$g = 386$ in./sec.$^2$
$I = 0.177 \times 10^{-3}$ inch lb. sec.$^2$ or 0.203 gm. cm. sec.$^2$
$\omega_1 = 800\pi$ ($N = 24,000$ r.p.m.) r.p.m. of rotor
$\omega = \omega_1 r = 209$ ft. per sec.
$V_R^2 = \omega + V_2 = 1238$ ft./per sec. = exit velocity
$t_1 = .5$ sec. run up time The construction of the rotor may be varied from that shown in FIGURES 1, 2 and 3 and hereinbefore described.

The number of radial passages through the rotor support member may be varied depending upon the amount of gas flow required and the run up time and operating r.p.m. of the rotor.

The number of rows of radial passages through the rotor, and the number of radial passages per row, may be increased or decreased depending upon the size and r.p.m. of the rotors and run-up time required.

The angle between the outlet openings through the rotor plugs and passages through the rotor, may be varied to obtain optimum reaction, depending upon the pressure of the gas flowing through the rotor.

Although but one preferred embodiment of the invention has been illustrated and described, it will be apparent to those skilled in the art that many changes may be made in the preferred gas driven gyro as illustrated and described without departing from the spirit and scope of this invention. Accordingly, this invention is to be considered as being limited only by the following claims appended thereto.

What is claimed is:

1. A free rotor gyro comprising a housing formed in two sections, each section having a closed-end cavity therein, the cross-sectional contour of the inner surface of the first section of the housing being in the form of an involute curve, a plastic insert fitted to the section of the housing, said insert having a spherical segmental central cavity therein, a spherical segmental rotor support member having a pair of stub shafts integral therewith, fitted to the hollow housing, co-axially therewith, means formed on the sections of the housing adapted to support the stub shafts of the rotor support member, a rotor formed in two sections fitted to the spherical segmental outer surface of the rotor support member, the outer surface of the rotor being of spherical segmental contour, said rotor support member having passage means formed therein co-axially aligned with the longitudinal axis of the housing sections, said passage means through the rotor support member being adapted to have gas under pressure from an external source injected therethrough, said rotor support member having a plurality of radially positioned auxiliary passages therethrough, in direct communication with the passage means through the rotor support member, each section of the rotor having a plurailty of radially positioned passages therethrough, said radially positioned passages through the rotor being adapted to receive gas under pressure from the auxiliary passages through the rotor support member, said rotor having a plurality of substantially tangential outlet passages, located at the spherical segmental outer surface of the rotor, each of the tangential outlet passages being in direct communication with one of the radially positioned passages through the rotor, the gas under pressure from the tangentially positioned outlet passages being adapted to rotatably drive the rotor, when the gas under pressure passes through the tangential outlet passages.

2. In combination with a free rotor gyro, as in claim 1, a plurality of substantially radially positioned plugs fitted to the spherical segmental outer surface of the rotor support member, each of said plugs having a reduced diameter nozzle opening therethrough, the nozzle openings being axially aligned with, and in direct communication with one of the radially positioned auxiliary openings through the rotor support member.

3. In combination with a free rotor gyro, as in claim 1, a plurality of substantially radially positioned plugs fitted to the spherical segmental outer surface of the rotor support member, each of said plugs being axially aligned with one of the auxiliary passages through the rotor support member, each of said plugs having a reduced diameter nozzle opening therethrough, each of the nozzle openings being axially aligned with and in direct communication with one of the radially positioned auxiliary passages through the rotor support member, the spherical segmental inner surface of the rotor having a relatively thin spherical segmental recess therein, the recess being in direct communication with the radial passages through the rotor, the gas under pressure in said recess being adapted to rotatably support the rotor relative to the rotor support member.

4. A combination free rotor gyro, as in claim 1, in which the spherical segmental inner surface of the rotor has a relatively thin spherical recess therein, the recess being in direct communication with the radial passages through the rotor, the gas under pressure in said recess being adapted to rotatably support the rotor relative to the rotor support member, a plurality of radially positioned plugs inserted into the spherical segmental outer surface of the rotor, each of said plugs being axially aligned with one of the radially positioned passages through the rotor, each of said plugs having a radially positioned cavity through the inner end thereof, each of said cavities being axially aligned with and in direct communication with one of the radial passages through the rotor, each of the tangential outlet passages through the rotor being cut through one of the plugs in direct communication with the inner cavity in the plug, the tangential outlet passages through the plugs and the inner cavities therein providing direct passage for the gas under pressure, received from the auxiliary openings through the rotor support member.

5. A combination free rotor gyro, as in claim 1, in which the two sections of the housing are joined on a plane substantially perpendicular to the longitudinal axis of the housing, means inserted through one section of the housing and threadably fitted to the other section thereof, fixedly attaching the two sections of the housing to one another, the two sections of the rotor being joined on a plane nominally aligned with the junction plane between the two sections of the housing, means inserted through the two sections of the rotor fixedly attaching the two sections of the rotor to one another, the spherical segmental inner surface of the rotor having a relatively thin recess therein, the recess being in direct communication with the radially positioned passages through the rotor, the gas under pressure in said recess being adapted to rotatably support the rotor relative to the rotor support member, a plurality of radially positioned plugs inserted into the spherical segmental outer surface of the rotor, each of said plugs being axially aligned with one of the radially positioned passages through the rotor, each of said plugs having a radially positioned cavity through the inner end thereof, each of said cavities being axially aligned with and in direct communication with one of the radial passages through the rotor, each of the tangential outlet passages being cut through one of the plugs, in direct communication with the inner cavity in the plug, the tangential outlet passages through the plugs and the inner cavities therein providing direct passage for the gas under pressure from the auxiliary openings through the rotor support member, a portion of the gas under pressure fed through the tangential outlet passages through the plugs passing through the interior of the section of the housing surrounded by an involute curve, a portion of the gas under pressure being adapted to engage one side of the rotor, when the junction plane through the rotor is tilted toward the section of the housing having the involute curve, the gas under pressure being adapted to angularly displace the rotor into a position in which the junction plane through the two rotor sections is substantially aligned with the junction plane through the two sections of the housing.

6. A free rotor gyro as in claim 1, in which the two sections of the housing are joined on a plane substantially perpendicular to the longitudinal axis of the housing, means inserted through one section of the housing and threadably fitted to the other section thereof, fixedly attaching the two sections of the housing to one another, the two sections of the rotor being joined on a plane nominally aligned with the junction plane between the two sections of the housing, means inserted through the two sections of the rotor fixedly attaching the two sections of the rotor to one another, the spherical segmental inner surface of the rotor having a relatively thin recess therein, the recess being in direct communication with the radially positioned passages through the rotor, the gas under pressure in said recess being adapted to rotatably support the rotor, relative to the spherical segmental outer surface of the rotor support member, a plurality of radially positioned plugs inserted into the spherical segmental outer surface of the rotor, each of said plugs being axially aligned with one of the radially positioned passages through the rotor, each of said plugs having a radially positioned cavity through the end thereof directed toward the radial passage through the rotor, each of said cavities being axially aligned with and in direct communication with one of the radial passages through the rotor, each of the tangential outlet passages being cut through one of the plugs in direct communication with the inner cavity in the plug, the tangential outlet passages through the plugs and the inner cavities therein providing direct passage for the gas under pressure from the auxiliary passages through the rotor support member, said gas under pressure being discharged into the interior of the two sections of the housing, each section of the housing having a plurality of exhaust openings therethrough, the exhaust openings through the housing sections allowing the gas released into the interior of the housing sections to be discharged therethrough.

References Cited in the file of this patent

UNITED STATES PATENTS

| | | |
|---|---|---|
| 1,972,882 | Gillmor | Sept. 11, 1934 |
| 2,474,072 | Stoner | June 21, 1949 |
| 2,729,106 | Mathieson | Jan. 3, 1956 |

FOREIGN PATENTS

| | | |
|---|---|---|
| 314,888 | Germany | Oct. 16, 1919 |